Feb. 6, 1940.   N. BENDER   2,189,528
AUTOMATIC VEHICLE SIGNAL
Filed Aug. 7, 1936
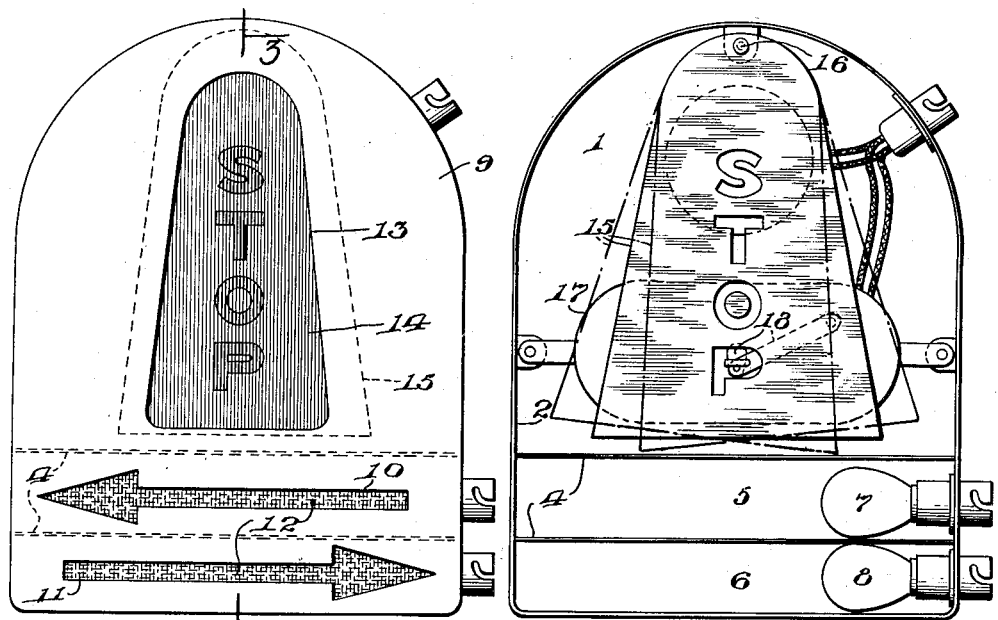
Fig. 1.   Fig. 2.
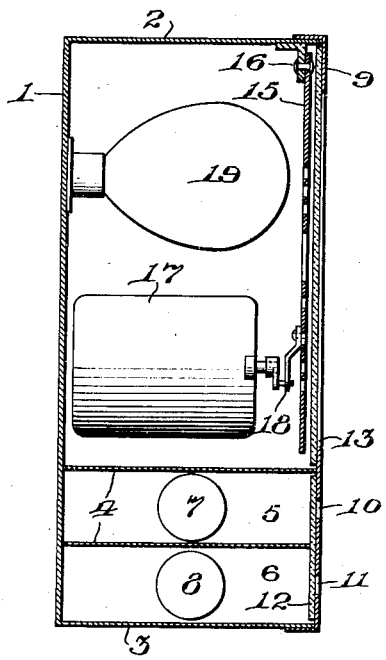
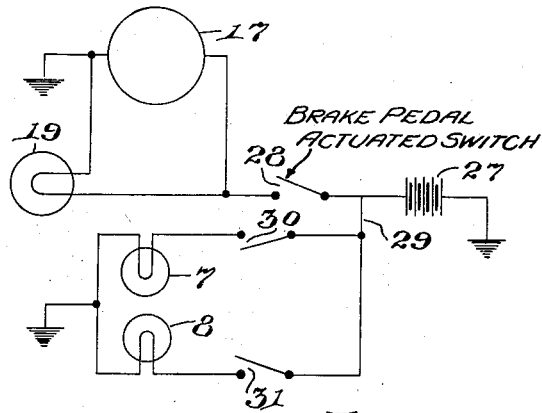
Fig. 3.   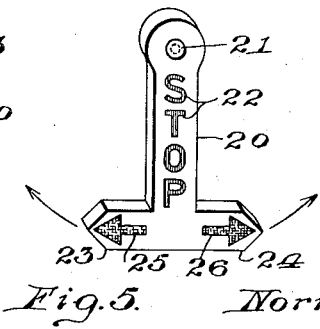   Fig. 4.
Fig. 5.
INVENTOR
Norman Bender,
BY
J. Stuart Freeman
ATTORNEY Patented Feb. 6, 1940

2,189,528

UNITED STATES PATENT OFFICE 2,189,528

AUTOMATIC VEHICLE SIGNAL

Norman Bender, Philadelphia, Pa.

Application August 7, 1936, Serial No. 94,753

2 Claims. (Cl. 177—329)

The object of the invention is to provide improvements in automatic signals broadly, but more especially in that type which is adapted to be operatively mounted upon a vehicle, for the purpose of informing the driver of a following vehicle, when the driver of a leading vehicle is about to slow, stop, or turn to the right or to the left.

Another object more specifically, is to provide in a device of this character, the combination of an oscillatory signalling member, a portion of which is formed as a colored transparency, with means to actuate the said member, comprising either a pneumatically or electrically driven motor, together with independently illuminated and preferably colored transparencies, by which the direction to be taken by the vehicle is indicated, as well as indicating also the fact by said oscillatory member, that the leading vehicle is about to slow or stop.

A further object is to house the entire mechanism, signalling means, lamps, etc., within a relatively compact casing, and to provide electric connections with a source of current, a switch preferably actuated by the usual brake pedal, and switches either manually or automatically actuated, to control the energizing of the several lamps involved.

Still another object is to provide a slightly modified form of the device, in which the oscillatory member comprises a hollow pendulum, having substantially the shape of an inverted T, the shank of the pendulum containing a lamp and a colored transparent indicia, to indicate the intention of the driver to "stop," while the arms of the pendulum are provided with independently energized lamps, to indicate the direction to be taken by the driver, depending upon whether the right or left arm is so illuminated.

And a still further object in its broadest conception is to provide a vehicle signalling device, in which an angularly oscillatory element operates to impart a signal, whether said element is itself illuminated, or by its movement to and fro blinds or blanks out transparent or other suitably illuminated indicia, as for instance when the casing is provided with spaced character-shaped apertures or transparencies, which are alternately covered and uncovered by the oscillatory movement of said element.

With these and other objects in mind, the invention comprises further details of construction and operation, which are hereinafter fully brought out in the following description, when read in conjunction with the accompanying drawing, in which Fig. 1 is an elevational view of a device comprising one embodiment of the invention; Fig. 2 is a similar view of the same, but with the front wall removed; Fig. 3 is a central vertical sectional view of the device as shown in Fig. 1; Fig. 4 is a wiring diagram of the electrical connections involved; and Fig. 5 is a perspective view of a modified form of oscillatory member.

Referring to the drawing, one embodiment of the invention is shown as comprising a casing which, in turn, is composed of a rear wall 1, an inverted U-shaped side wall 2, closed at its lower end by a bottom wall 3, while a pair of horizontally extending, vertically spaced partitions 4 are positioned within said casing and subdivide the lower part of the same into two compartments 5 and 6, in which are positioned electric lights 7 and 8. The front of said casing is normally closed by a removable wall or closure 9, which, it will be understood, in the case of a tail light, is actually directed towards the rear of the vehicle by which it is carried.

The lower portion of said closure is provided with a pair of apertures 10 and 11, having the shape of arrows which point respectively towards the left-hand and right-hand sides of the device and are spanned upon their inner side by either a clear or colored transparent element 12, through which the light from the lamps 7 and 8 shines selectively, to indicate the direction towards which the driver of the vehicle intends to turn the same.

The upper portion of said closure is provided with an upwardly extending aperture 13, which is also spanned by either a clear or colored transparent element 14, while to the rear of said last-mentioned aperture and transparent element, there is positioned an oscillatable signal element 15, which is preferably pivoted at its upper end 16 to the interior of said casing, and is itself provided with cutout regions, preferably in the shape of letters to spell the word "Stop," or other suitable indicia which will indicate to a following driver, that the driver of the vehicle provided with the improved signal mechanism intends to "stop."

The movement of this oscillatory element is effected by means of either an electric motor 17, through a crank and link connection 18, or by means of a pneumatic or other suitable type of motor, as may be desired, while the letters or other indicia carried by said oscillatory element are illuminated by a light 19, positioned in the upper portion of said casing.

Instead of the oscillatory member 15, shown in Figs. 1, 2 and 3 with the arrows 10 and 11 separate and independent of the same, these may all be combined in a single oscillatory element such as is shown in Fig. 5, and comprising an upwardly extending shank 20, pivotally supported at 21 and provided in its exposed wall with letters or other indicia 22, which may be illuminated by a lamp (not shown) within said shank, which in this case, is of hollow construction. Such modified form of oscillatory element may have the shape of an inverted T and comprise depending, oppositely directed arms 23 and 24, which, being hollow, may contain lamps (not shown) which are adapted to cast their rays through arrow-shaped apertures 25 and 26, respectively.

By such a construction as in the first case, the "Stop" signal is illuminated, if the driver intends to slow down or actually stop his vehicle, but without intending to turn the same either to the right or to the left. If, instead, such driver intends to both slow his vehicle and turn to the right or to the left, he illuminates the "Stop" signal and the proper arrow transparency to indicate the direction which he intends to take. Again, if he intends to make a wide turn without slowing his vehicle, as by bringing into operation either of the usual brake levers carried by an automobile, such driver may illuminate either of the arrow indicating transparencies, without illuminating the "Stop" signal.

Referring to Fig. 4, a simple wiring diagram for this devcie is shown as comprising the motor 17 and the lamp 19 in parallel, and energized by the usual battery 27 upon the closing of a switch 28, which may be actuated automatically by or upon the actuation of either or both the pedal and the hand brakes of the usual automobile. A wire 29, connected in the circuit just described between said battery and said switch, leads current through a left-turn switch 30, or a right-turn switch 31, which are connected through the lamps 7 and 8 respectively, and which last-mentioned switches are conveniently located so that the driver can actuate either of them as may be necessary, to indicate the turn which he intends to make, either simultaneously with or independent of the closing of the stop-indicating switch 28 by, or upon the actuation of a switch lever as hereinbefore referred to.

In interpreting the appended claims, it is to be understood that the particular form of the device hereinbefore described, and illustrated in the accompanying drawing, is merely illustrative of one embodiment of the invention, and that said invention is capable of being modified in many ways, as to the exact details of its construction and operation, without departing from the scope of the appended claims.

Having thus described my invention, what I claim as new and desire to protect by Letters Patent of the United States is:

1. A vehicle signalling device comprising a casing having an opening therethrough, a signal member within the casing observable through said opening, signal indicia on said signal member, means operable to wig-wag said signal member, said signal member being of greater area than the opening to function as a closure therefor and prevent observation of the interior of the casing at the marginal edge of the signal member in all positions of the latter.

2. A vehicle signalling device comprising a casing having an opening therethrough, a signal member within the casing observable through said opening, signal indicia on said signal member, means pivoting said signal member adjacent its upper end to the casing, a motor supported within the casing, a connection from the motor to the signal member operable to wig-wag the signal member, said signal member being of greater area than the opening to function as a closure therefor and prevent observation of the interior of the casing at the marginal edge of the signal member in all positions of the latter.

NORMAN BENDER.